US012774675B2

(12) United States Patent
Thompson et al.

(10) Patent No.: US 12,774,675 B2
(45) Date of Patent: Oct. 27, 2026

(54) CHEMICAL ATOMIZER FOR CHEMICAL INDUCTION DELIVERY

(71) Applicant: ATS Chemical LLC, Albuquerque, NM (US)

(72) Inventors: Bernie C Thompson, Tijeras, NM (US); Robert Keith Anderson, Rio Rancho, NM (US)

(73) Assignee: ATS Chemical LLC, Albuquerque, NM (US)

( * ) Notice: Subject to any disclaimer, the term of this patent is extended or adjusted under 35 U.S.C. 154(b) by 53 days.

(21) Appl. No.: 18/902,626

(22) Filed: Sep. 30, 2024

(65) Prior Publication Data

US 2026/0055724 A1 Feb. 26, 2026

Related U.S. Application Data

(60) Provisional application No. 63/685,582, filed on Aug. 21, 2024.

(51) Int. Cl.
*F02B 77/04* (2006.01)

(52) U.S. Cl.
CPC .................................... *F02B 77/04* (2013.01)

(58) Field of Classification Search
CPC ........................................................ F02B 77/04
See application file for complete search history.

(56) References Cited

U.S. PATENT DOCUMENTS 6,071,355 A * 6/2000 Suratt ...................... F02B 77/04 134/22.12
6,623,154 B1 * 9/2003 Garcia .............. B01F 25/31422 137/888
2014/0224895 A1 * 8/2014 Cornett ................... B05B 1/202 239/8
2018/0238229 A1 * 8/2018 Thompson ............ C10L 1/1608
2020/0340397 A1 * 10/2020 Thompson .............. F02B 77/04
2022/0128000 A1 * 4/2022 Probus .................... F02B 77/04

FOREIGN PATENT DOCUMENTS

FR 2998880 A1 * 6/2014 ............ F01M 11/04

OTHER PUBLICATIONS

FR2998880A1 Abstract (Year: 2014).*
FR2998880 machine translation (Year: 2014).*

* cited by examiner

*Primary Examiner* — Douglas Lee
(74) *Attorney, Agent, or Firm* — V Gerald Grafe

(57) ABSTRACT

The invention facilitates atomization of the chemical so that it can be carried by the energy of the moving air column. Embodiments provide a restriction in a flow path from a source of chemical to the engine. First and second air inputs are provided that facilitate the chemical being broken up into small droplets.

9 Claims, 6 Drawing Sheets

CHEMICAL ATOMIZER FOR CHEMICAL INDUCTION DELIVERY

FIELD OF INVENTION

The present invention is for removing carbon from the induction system and combustion chambers of an internal combustion engine. The device uses a restriction to accelerate the chemical fluid while air is bled into the high velocity chemical stream. This provides a means to break up the chemical into very small chemical droplets that can be suspended in the air flow moving into the engine. Thus, carrying the droplets of chemical to the carbon deposits within the induction system and combustion chambers. This atomizer works to produce a chemical fog (atomized liquid chemical very fine particles or droplets) into the running engine so the chemical can be evenly applied into the induction system and combustion chambers so it can be properly cleaned. Regardless of how effective the chemical is it must be delivered throughout the induction system and into the combustion chamber to actually clean the carbon deposits from an internal combustion engine.

BACKGROUND OF THE INVENTION

It has long been known that carbon deposits accumulate within the internal combustion engine. These carbon deposits have been unwanted since their discovery over a hundred years ago, and finding methods to remove these deposits from the engine continues to be a problem today. Carbon deposits are inherent in the internal combustion engine, and need to be removed in order to provide good performance, fuel economy and emissions. There have been many attempts to deliver cleaning chemicals into the engine.

In U.S. Pat. No. 4,671,230 Turnipseed discloses a device that holds or contains a mixture of carbon cleaning solution and gasoline. The vehicle's fuel supply system is disabled from the engine and the invention is connected to the fuel delivery for the engine. The invention then supplies the engine with the pressurized cleaning solution as the engine is run. This cleaning solution is then delivered through the engine injectors. The problem with this method is that the cleaning solution is only applied to the intake valve and the immediate intake port area around the intake valve. The rest of the induction system remains uncleaned. Additionally, if the engine is that of a direct injection design, no intake cleaning will take place at all. And all current automobile engines in the USA are all Gasoline Direct Injection (GDI). In a GDI engine, gasoline is injected directly into the combustion chamber. This method is prone to heavy carbon deposits on the intake valve and intake port area. The Turnipseed device does not remove these carbon deposits.

U.S. Pat. No. 6,530,392 B2 Blatter discloses a device that applies cleaning chemical into the engine through the vacuum port. The base of the invention holds a can of chemical cleaner and has a means to adjust the flow rate of the cleaner that can be observed through a sight glass. The base is connected to the nozzle with a tube. The nozzle has a hole drilled at a 90 degree angle that will bleed air from the atmosphere into the discharge. The nozzle is connected to the engine vacuum hose on the engine's intake system. The engine is then started and run where the low pressure created by the running engine pulls the cleaner into the intake tract. The cleaner flow rate can be adjusted by turning the adjustment screw while watching the flow through the sight glass. The entire can of chemical is delivered to clean the engine. As the cleaner is pulled into the intake tract, air from the air bleed is also pulled into the intake tract through the air bleed. This air bleed breaks up the liquid cleaner into smaller droplets.

The problem with Blatter's method is the droplet size is not consistent. As the engine is running the droplet size is both small and large without being held at any point. As the liquid is broken up into droplets by the air bleed, the air to cleaner ratio is constantly changing. This allows the creation of droplets that are too large to be transported by the air flow making it difficult for the chemical to reach the carbon sites. These conditions will also cause puddling of the chemical in the intake as has been witnessed during numerous tests. Puddling with a high chemical volumetric flow rate can cause hydrolocking of the engine, or severe engine damage to occur. Furthermore as can be seen in U.S. Pat. No. 11,193,419B2 Bernie C. Thompson; incorporated herein by reference, the best way to remove heavy carbon deposits is to use high chemical cleaner volumetric flow rates so the entire induction system is wetted. It has been found through hundreds of tests that vapor does not remove carbon deposits. It will take a high volume of liquid chemical to solubilize and remove heavy carbon deposits. So, it is important that all the chemical is completely atomized to be carried into the engine so the carbon deposits can be removed without chemical puddling that can severely damage the engine.

Devices that can deliver the chemical effectively to the induction system such as the inventor's previous devices disclosed in CA2963789 Bernie C. Thompson or US20240060447A1 Bernie C. Thompson, each incorporated herein by reference. These devices use computer controlled solenoids and are very effective, but also complicated and expensive. What is needed is a means to accomplish an effective chemical delivery with an inexpensive, easy to use tool that actually works and can be used by the Do It Yourself (DIY) mechanic as well as the professional mechanic.

As can be seen, the prior art has many limitations. These limitations pose significant problems when cleaning the induction system. What is needed is the means to quickly and easily remove the carbon from the internal combustion engine. The present invention accomplishes these goals.

SUMMARY OF THE INVENTION

The above described systems of Turnipseed and Blatter have problems delivering the chemical thus problems with removing carbon from the internal combustion engine's induction system in real world situations. For any chemical to be effective it must first be delivered to the carbon sites. To accomplish this air flowing into the engine is used. This energy of the moving air column will carry the chemical into the engine. The question is, how effectively is the chemical being carried to the carbon sites? With Thompson's devices the chemical is effectively delivered, however these devices are very complex and expensive. The present invention provides a simpler tool for the chemical delivery. For example, the present invention can be implemented as a completely mechanical system with no adjustments needed by the user such as chemical or air bleed delivery. The device can be simply connected to the vacuum port located behind the throttle blade in a centralized location; such as the positive crankcase ventilation (PCV) or purge control vacuum port. The engine is started and the vortex on/off valve is opened. The engine is set to a high idle ("high idle" is dependent on the specific characteristics of the engine, for many automotive engines a "high idle" is between 3000-4000 revolutions a minute (RPM)); this will produce vacuum so the chemical will be pushed into the engine by higher atmospheric air pressure, now the throttle will have frequent snap throttle events during cleaning. The chemical is delivered at a high volumetric flow rate where 8 ounces is delivered in 49 seconds. This is to ensure the induction system is totally wetted. With this volume it will be important that the chemical is atomized. Once the chemical has been totally delivered the cap seal plug is removed and the next chemical blend is poured into the reservoir through the quick fill cap to the marked line on the reservoir can. This makes a quick easy delivery system for the masses.

The invention facilitates atomization of the chemical so that it can be carried by the energy of the moving air column. If the chemical is atomized it can effectively be carried throughout the induction system and into the combustion chambers without puddling in the induction system. Thus cleaning induction carbon accumulation in different areas such as the intake plenum, intake runner, intake runner valves, intake swirl valves, charge valve, fuel injector tip, intake port, the intake valve and the combustion chambers. These carbon deposits can disrupt the air flow into the cylinder causing performance and drivability issues. So it can be important to clean the entire induction system. The present invention completely atomizes the chemical cleaner in order to accomplish these goals.

During testing, borescopes were used to observe the chemical delivery inside of running engines. This data was used to inform example embodiments of the present invention. In example embodiments the inventor observed a complete fog as soon as the chemical on/off valve was opened. This fog completely wetted the entire induction system, then the moving air pushed the chemical down the induction system runners where, once down the intake runner, beads of chemical formed on the inside of the induction system walls. As these beads of chemical moved down the intake runners by the intake valve pocket area they were lifted off the intake runner by the moving air column. Large droplets of chemical formed that were moved by the air flow to the intake valve port area. The intake valve pocket area looked like it was being rained on; actually it looked more like a hurricane. This process allowed the carbon to be removed. The greater the rain storm in the intake the greater the carbon removal rate was. This process was repeatedly observed.

For any chemical to be effective it must first be delivered to the carbon sites in a liquid format. To accomplish this air flowing into the engine is used. This air flowing into the engine is in a low state of pressure due to the closed or partial closed throttle plate at idle or high idle during cleaning. So the higher atmospheric air pressure pushes the chemical and air through the atomizer and into the engine. When delivering chemical the throttle valve is snapped frequently in order to help move the chemical through the induction system and into the combustion chamber so the chemical can remove carbon deposits.

In modern engine designs the induction tract often has a scroll style intake. The air entering through the throttle body may be at a lower point than the intake valve, additionally the intake tract may scroll upward and then back down to the intake valve port area. The intake may also have a charge valve which isolates two different intake runner lengths, these different length runners help with cylinder charge or fill. When induction cleaning chemical is in the air column and is moving around these intake bends the chemical tends to fall out of the air column to the intake system's floor. When this occurs the intake tract floor can be cleaned, however the intake tract top and side are left with carbon deposits. It is important to have a true aerosol delivered to the intake tract that can remain airborne. Years of testing have shown this to be very difficult to accomplish.

Embodiments of the present invention use a restriction, not to lower the pressure using the Bernoulli effect (Bernoulli's principle states that an increase in the speed of a fluid occurs simultaneously with a decrease in pressure) but to accelerate the chemical fluid speed and bleed air into this fluid stream before entering the restriction and becoming a high velocity fluid stream which helps atomize the chemical cleaning fluid. If the air is bled into the chemical fluid stream right before the restriction the air and fluid are accelerated together. This allows the chemical to be broken up into small droplets. Further testing provided data that a second air bleed into the beginning of the actual restriction after the first air bleed will further atomize the chemical for delivery into the engine. These air bleeds are in fluid communication with atmospheric air in some embodiments, and with a source of pressurized gas (such as air) in other embodiments. This apparatus and method worked much better than would be expected by those skilled in the art. The results when balanced with a chemical metering jet that limits the chemical flow rate into the atomizer were impressive.

A testing device used for many years by the inventor is shown in FIG. 1. This device is made with clear plastic manifold (2)(3) with throttle valve (4) so one can actually see the fluid delivery. A measured amount of fluid is installed into the reservoir (not shown). Then the wet dry vacuum (1) is started and it pulls a vacuum against throttle valve (4) which in turn pulls a vacuum inside manifold (2)(3). Then the fluid water (water being nonflammable but having similar traits to the chemical cleaner was used) is pulled into the manifold. Only a true aerosol can move from lower manifold chamber (2) into upper manifold chamber (3) and into wet dry vacuum (1) at the end of the test the fluid that puddled in the bottom tube (2) is measured for volume. With the present invention no measurable amount of fluid remains in the bottom tube (2). All of the fluid remains airborne. The inventor has tested all of the devices known to him on the market, as well as many of the inventor's own designs, and no other delivery method provides for completely airborne fluid.

Furthermore, in a running engine the vacuum and volume are much greater than in this testing machine, thus any chemical delivery device should work better in an actual engine than with this testing system shown in FIG. 1. This has been repeatedly observed during testing embodiments of the present invention in actual running engines. Embodiments of the present invention worked better than the most effective alternative known to the inventor, i.e., systems which use computer-controlled solenoids with an air assist delivery nozzle as described in the Thompson patents referenced above. Many cycles of design, implementation, and testing were performed to define suitable embodiments of the present invention. The factors involved in the performance of such a system are too complex for theory or routine engineering; exhaustive trial and error was needed to realize suitable embodiments.

DESCRIPTION OF THE INVENTION

Figure 1:
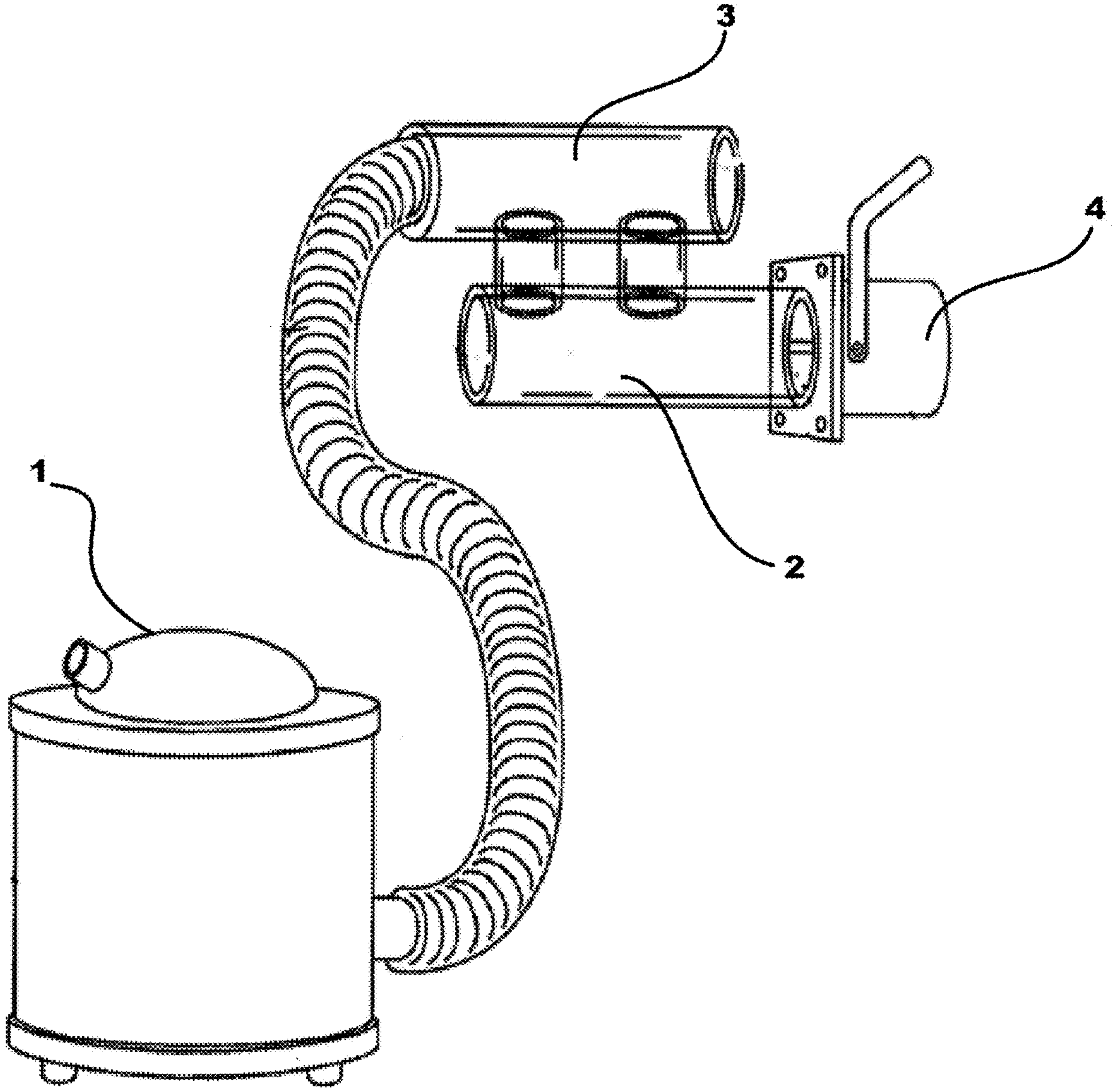
FIG. 1 is a schematic illustration of a vacuum testing apparatus.
Figure 2:
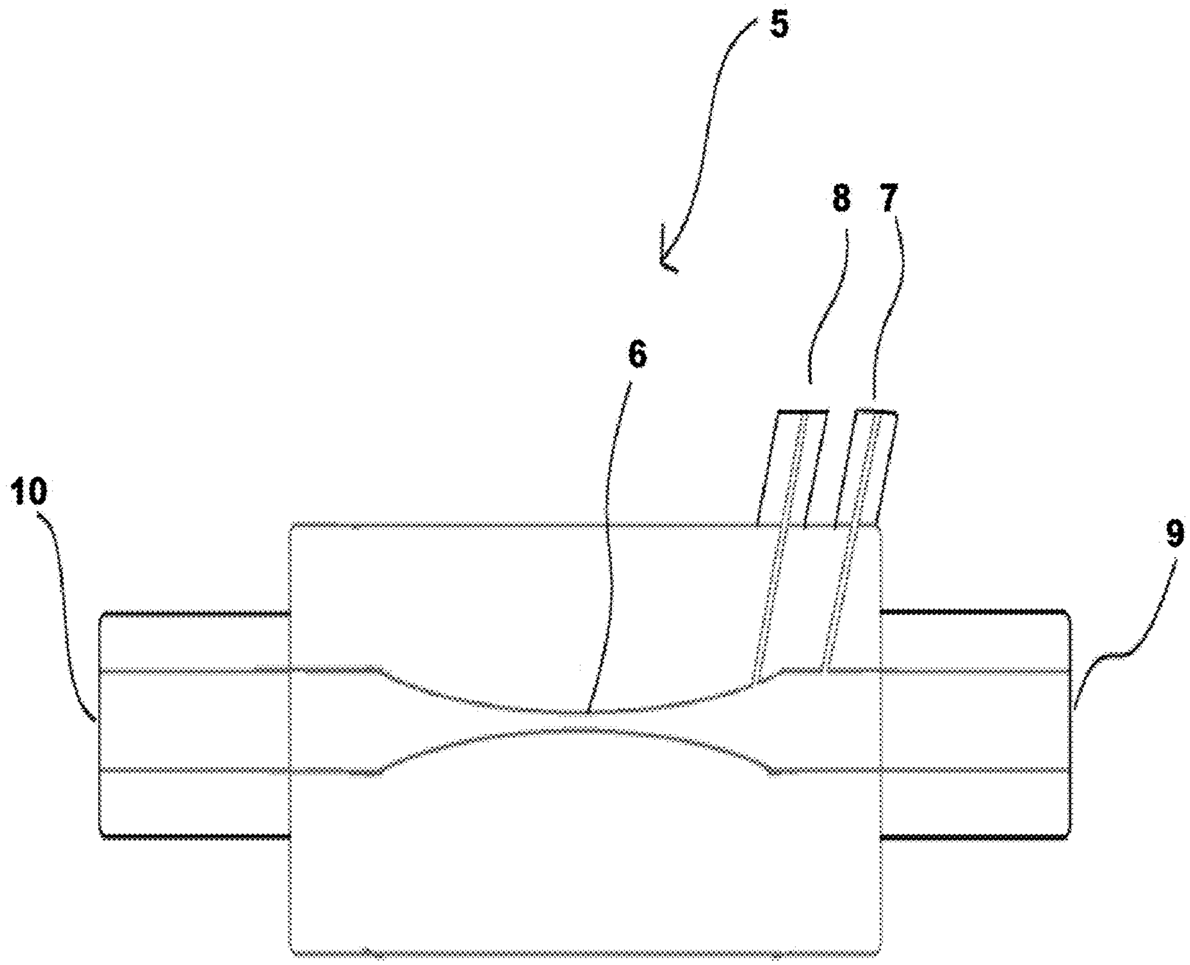
FIG. 2 is a schematic illustration of a cutaway drawing of an example embodiment.

An example embodiment of the present invention is shown in FIG. 2 (5). The restriction or primary passage (6) is smaller in cross-sectional area, e.g., 70% smaller, than the inlet (9) or the outlet (10). This allows the chemical to accelerate through the restriction reaching a high velocity fluid speed. When atmospheric air pressure is bled into the chemical and accelerated with it to that of a high velocity fluid stream (not shown) through port (7) this allows the air to break up the chemical flow into smaller units or atomize the chemical into very fine particles or smaller droplet sizes.

During testing if there was only one air bleed orifice port (7), and if the air bleed was made too big the engine vacuum would stop pulling in chemical from the reservoir and would only pull in air through the air bleed. So to test an idea the air bleed was located at the beginning of the restriction (8). During testing these two air bleeds performed very differently. Port (7) bleeding air before the restriction was discovered to be very important in order to break up the chemical effectively. However this port could not be made large enough to properly break up the chemical fluid stream.

Through observation and testing the inventor discovered that a second bleed port would overcome this problem of not being able to break up the chemical thoroughly enough with one air bleed port. The example embodiment in the figure shows a two air bleed port system (5) with ports (7) and (8). The first air bleed (7) is before the restriction and the second air bleed port (8) is in the beginning of the restriction. The air can be metered more accurately into the chemical stream; the orifice on port (7) was made smaller and the orifice on port (8) was made bigger.

Figure 3:
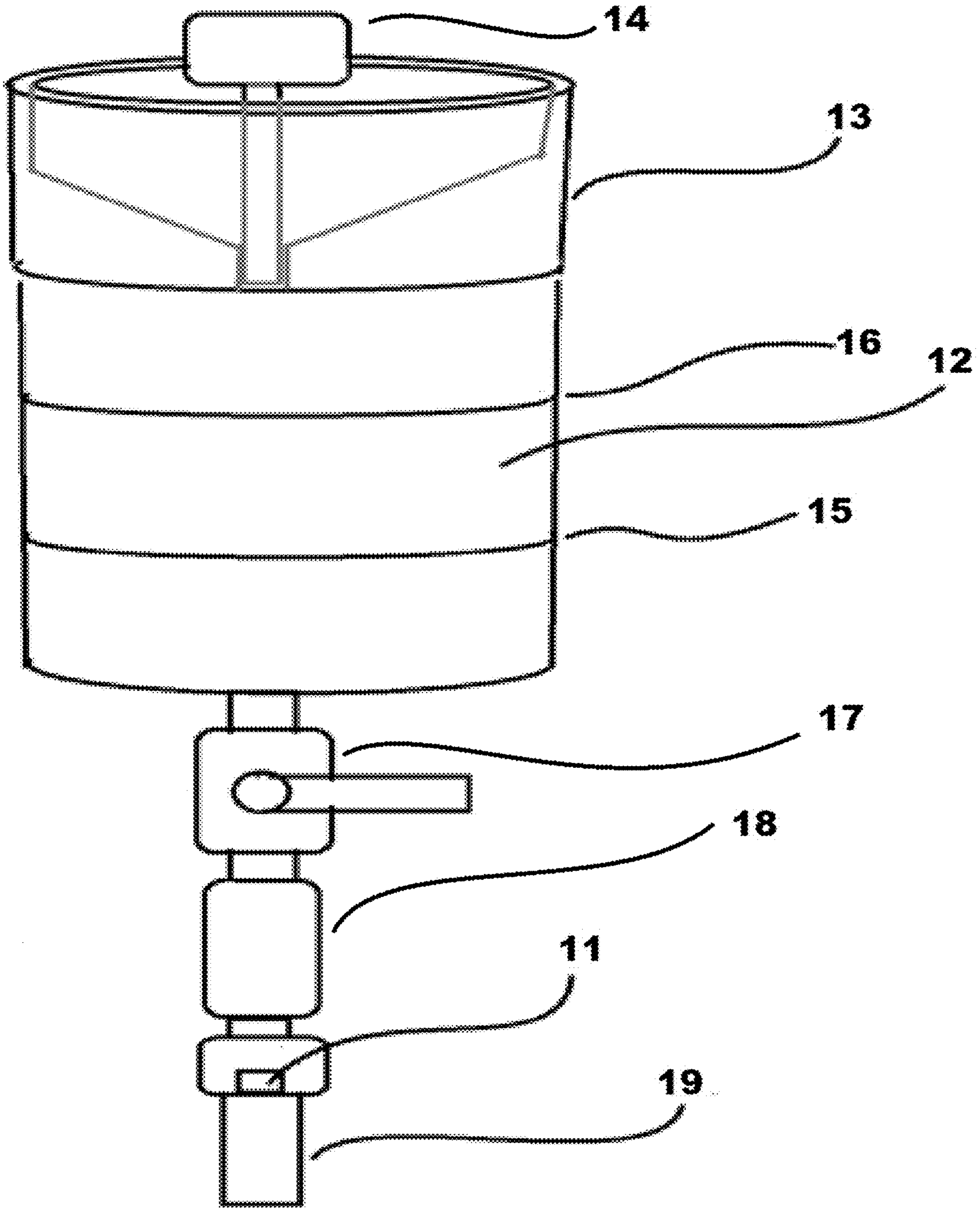
FIG. 3 is a schematic illustration of a vortex reservoir assembly.

The atomizer shown in the figure works exceptionally well. The system can benefit from a way to control or balance the chemical rate to the air bleed port size. So a chemical metering jet or restriction for metering the chemical into the atomizer was added as shown in FIG. 3 (11). In FIG. 3, a reservoir (12) for containing the chemical has a reservoir cap (13) with quick fill seal plug (14) for holding the chemical into the reservoir and quick filling the reservoir. Manual shutoff valve (17) controls the chemical flow on or off, filter (18) prevents orifice (11) from plugging. Hose connection (19) holds orifice (11) and connects hose to atomizer (5 in FIG. 2).

The ability to meter the chemical rate enables balancing the forces within the atomizer (5) to deliver different chemical blends; in other words the flow rate for the individual chemical blend delivery can be optimized. E.g., a chemical can be completely atomized with the chemical delivery rate being >4 gallons an hour; this allows continuous delivery without frequent pausing of the chemical delivery. This can be accomplished with no puddling in the induction system.

Figure 4:
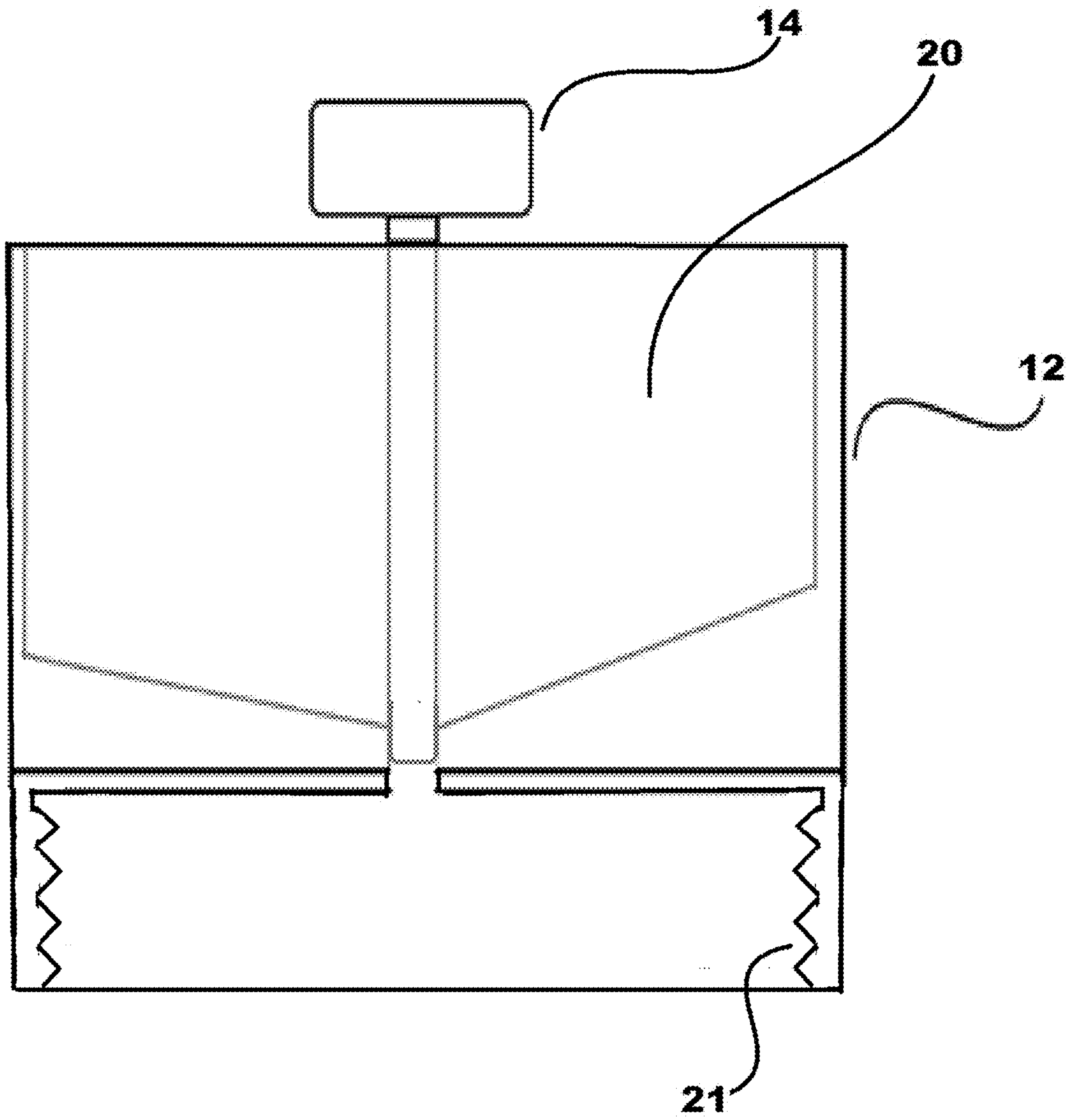
FIG. 4 is a schematic illustration of a quick fill funnel cap with seal plug.

This embodiment provides a delivery tool that can completely wet the entire induction system with chemical, thus proper carbon deposit removal can occur so long as the chemical blend is suitable for removal of the carbon type in the engine. An example reservoir is made and marked where it holds 4 oz (15) for chemicals A and B or 8 oz (16) for chemical C. This allows for chemical A to be delivered with 4 oz then chemical B to be delivered with 4 oz, then chemical A with 4 oz then chemical B with 4 oz, thus chemical layering can be achieved. In order to make this easy to do with one reservoir, in FIG. 4 the reservoir cap (12) with threads (21) is made with a quick fill funnel (20) design with seal plug (14) so the different chemical blends can be changed out or alternated quickly. Chemical layering works well to remove heavy carbon deposits, as described in US20200340397A1 to Bernie C. Thompson, incorporated herein by reference.

Figure 5:
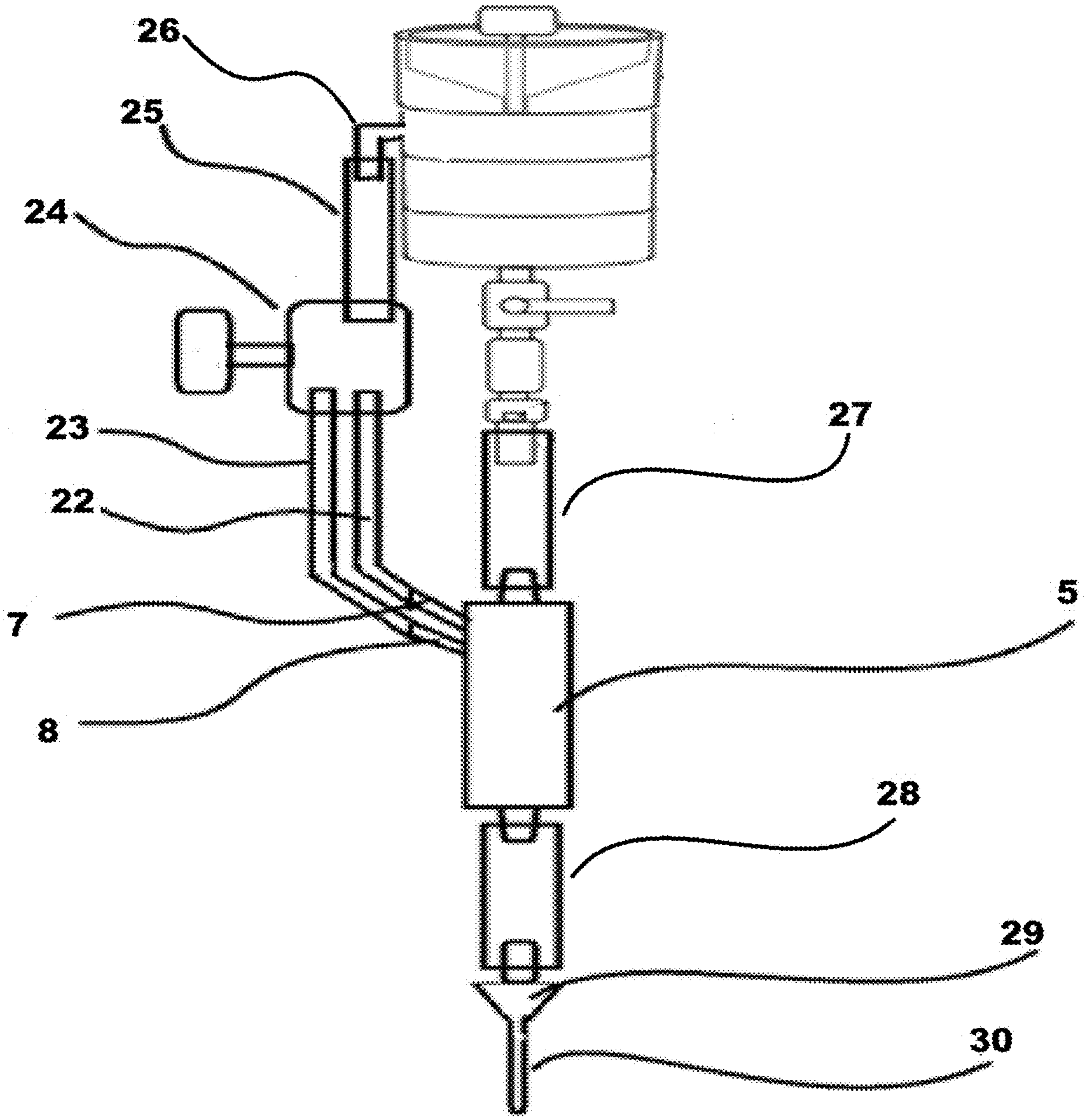
FIG. 5 is a schematic illustration of bleed vent hoses with air filter.

8 oz of chemical C can then delivered to remove the carbon that chemical A and B left behind. With this technique heavy carbon deposits can be removed quickly. With further testing on some turbocharged engines, during snap throttle a positive pressure could push chemical out the air bleeds (7) and (8). As shown in FIG. 5, vent tubes (22) and (23) can be included with an air filter (24). Additionally, a vent (26) from the reservoir (12) allows a tube (26) from the reservoir vent (26) to the air filter (24) was added.

Figure 6:
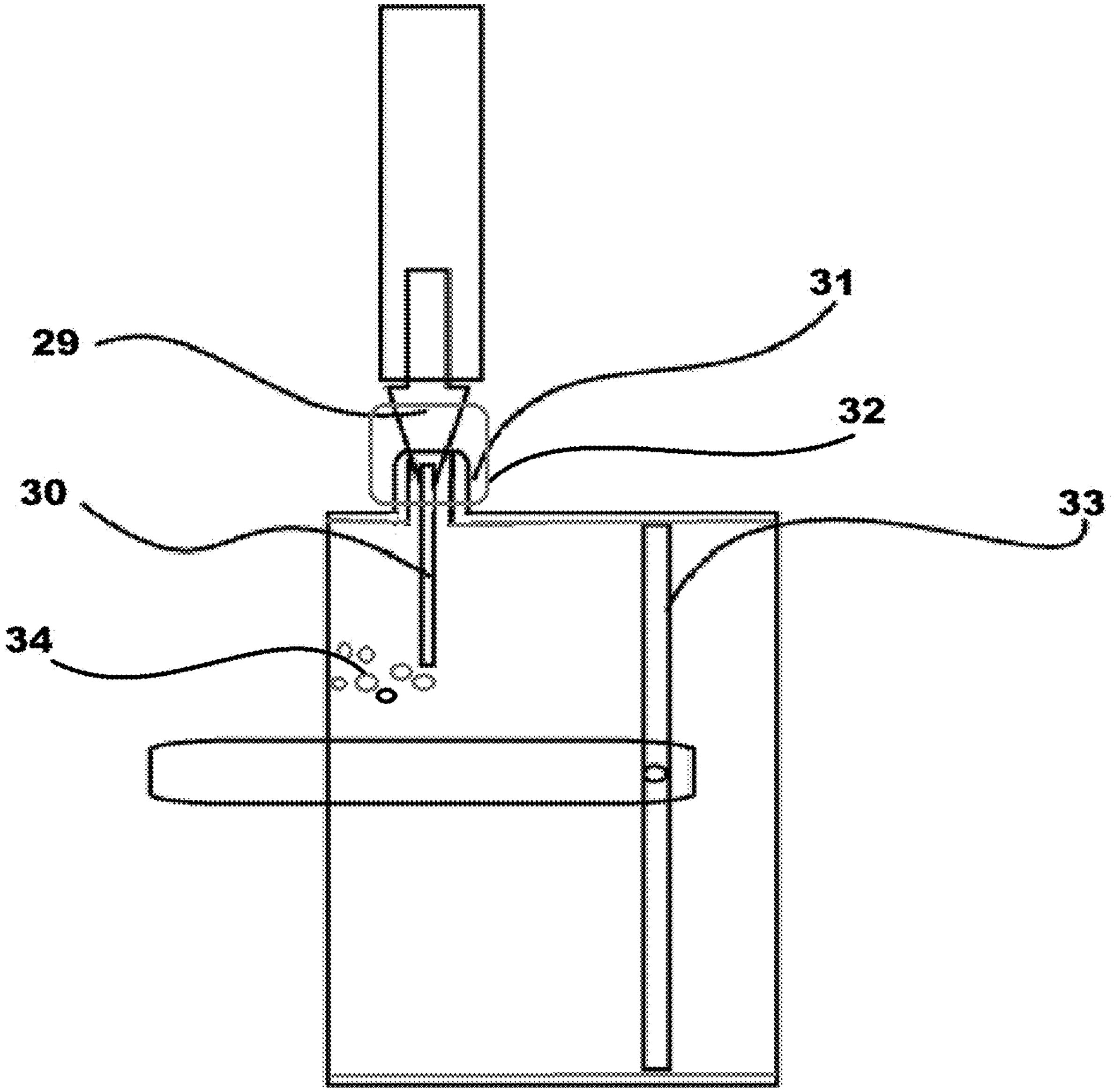
FIG. 6 is a schematic illustration of a connection to the engine using a nozzle tube delivery hose.

As shown in FIG. 6, in order to connect the device to the engine vacuum port (31) located behind the throttle blade (33); nozzle (29) is used and sealed to port with rubber hose (32). Nozzle (29) has delivery hose (30) which extends into induction system. Delivery hose (30) allows the chemical (34) to be dispensed directly into the moving air column. Thus making less chance of the chemical running out the vacuum port along the induction system floor or side, therefore producing unwanted puddling within the induction system. Delivery hose (30) helps with the chemical being delivered directly into the moving air column going into the engine. This prevents the chemical from hitting the vacuum port and induction system. Thus, keeping the atomized chemical air born and moving with the air column into the engine.

Additional testing has shown that this system can be used with compressed air. If the reservoir is pressurized and the pressure is applied to vents (7-8) this system will atomize the liquid chemical. This allows this system to be used without engine vacuum such as but not limited to Diesel engines.

The invention shown above is the culmination of years of research and development. Whereas the drawing and accompanying description have shown and described the preferred embodiments of the present invention, it should be apparent to those skilled in the art that various changes may be made in the forms and uses of the inventions without affecting the scope thereof.

What is claimed is:

1. A method of applying liquid carbon cleaning chemical into an internal combustion engine for the purpose of removing carbon deposits from the engine, where the engine has an intake port allowing air into an induction system of the engine and thence to a throttle plate, the method comprising:

(a) providing a device comprising a body having:

(a1) a primary passage connecting a fluid input port and a fluid output port and having an intermediate section between the fluid input port and the fluid output port, the primary passage having an input cross-sectional area at the fluid input port, an output cross-sectional area at the fluid output port, and an intermediate cross-sectional area in the intermediate section, where the intermediate cross-sectional area is less than the input cross-sectional area;

(a2) the body further having a first air input passage connecting a first air input port on the outside of the body to the primary passage at a point in the primary passage between the fluid input port and the intermediate section and (a3) the body further having a second air input passage connecting a second air input port on the outside of the body to the primary passage at a point between the fluid input port and the intermediate section;

(b) connecting the fluid input port of the device to a reservoir containing a liquid carbon cleaning chemical;

(c) placing the output port of the device in fluid communication with the intake port;

(d) starting the engine;

(e) setting the running engine to a high idle;

(f) flowing the liquid carbon cleaning chemical into the device where it is atomized, then flowing the atomized chemical through the intake port and into the engine.

2. The method of claim 1, where the device further comprises a metering orifice disposed between the reservoir and the fluid input port and wherein flowing the liquid carbon cleaning chemical into the device comprises flowing the carbon cleaning chemical from the reservoir through the connection and through the metering orifice.

3. The method of claim 1, wherein the device further comprises a control valve disposed between the reservoir and the fluid input port and wherein flowing the liquid carbon cleaning chemical into the device comprises flowing the carbon cleaning chemical from the reservoir through the connection and through the control valve.

4. The method of claim 1, further comprising providing a delivery hose having first and second ends, and placing the first end in fluid communication with the output fluid port of the device and the second end in the induction system where an air column moving through the induction system will receive atomized chemical from the delivery hose.

5. The method of claim 1, further wherein the reservoir has a quick fill funnel reservoir cap.

6. The method of claim 5, further comprising adding a second liquid carbon cleaning chemical to the reservoir such that the atomized liquid carbon cleaning chemical supplied to the engine provides chemical layering.

7. The method of claim 1, wherein the intake port comprises a vacuum intake.

8. The method of claim 1, further comprising providing pressurized gas to the first air input port, to the second air input port, or to both the first air input port and the second air input port.

9. The method of claim 1, wherein the intermediate cross-sectional area is less than the output cross-sectional area.

* * * * *